United States Patent [19]

Glötzl et al.

[11] Patent Number: 4,463,611
[45] Date of Patent: Aug. 7, 1984

[54] EXTENSOMETER

[75] Inventors: Rainer Glötzl, Ettlingen; Franz Glötzl, Rheinstetten, both of Fed. Rep. of Germany

[73] Assignee: Glötzl Gesellschaft für Baumesstechnik mbH, Rheinstetten, Fed. Rep. of Germany

[21] Appl. No.: 382,579

[22] Filed: May 27, 1982

[30] Foreign Application Priority Data

Mar. 31, 1982 [DE] Fed. Rep. of Germany ....... 3211822

[51] Int. Cl.³ .............................................. G01B 7/16
[52] U.S. Cl. .................................................... 73/784
[58] Field of Search ........................... 73/784; 52/632; 343/877, 880, 900, 903; 428/364

[56] References Cited

U.S. PATENT DOCUMENTS 2,681,412 6/1954 Webster ........................ 343/900 X
3,416,230 12/1968 Oleson et al. .................... 73/784 X

FOREIGN PATENT DOCUMENTS 1025728 4/1966 United Kingdom ................ 73/784

Primary Examiner—Jerry W. Myracle
Attorney, Agent, or Firm—Sandler & Greenblum

[57] ABSTRACT

In a rod extensometer for measuring movements in rock structures and in foundations, the measuring rod system consists of a one piece flexible rod made of reinforced plastic and surrounded by an encasing tube and connected at one end to a fixed-point anchoring device and by its other end to a pick-up element for the measuring value. This design enables the rod extensometer to be inserted into a borehole at short notice and with very little loss of time. Furthermore, the rod can form a practically endless structure wound onto a delivery spool and thus stored and transported with ease and in a space-saving manner.

6 Claims, 1 Drawing Figure

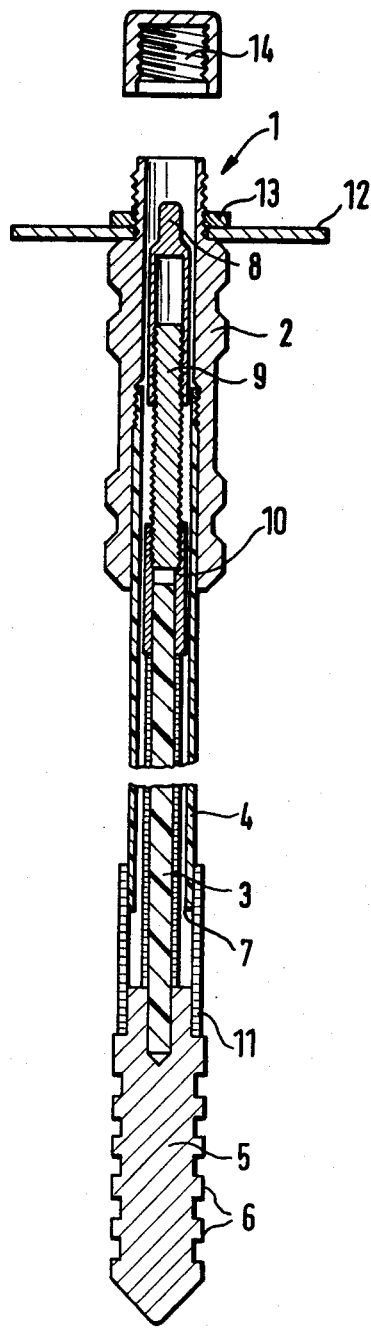

EXTENSOMETER

BACKGROUND OF THE INVENTION

The invention relates to an extensometer for measuring movements in rock structures and in foundations, particularly the movement of layers of rock, consisting of an anchor-type device to be secured at the measuring point, a measuring rod connected therewith, freely movable in an encasing tube and bearing a pick-up element at its free end, and an extensometer head connected with the encasing tube and secured at the pick-up element of the change in the position of the pick-up element of the measuring rod in relation to the extensometer head being measurable (hereinafter called a rod extensometer of the type described).

Extensometers of the aforementioned design are mainly used for measuring movement in rock layers, e.g. in the building of tunnels and earth dams, but are also employed for measuring subsoil displacements in structures above the surface. The measuring operation normally consists of the measurement of the difference between various layers as regards their movement, so that in general a number of separate extensometers are sunk to different depths and their respective changes in position measured.

In practice there are two main types of measuring apparatus, that is the wire extensometer and the rod extensometer. In the former type a wire is taken from the point at which the extensometer is secured in the rock to the head of the extensometer, where it is deflected by a roller and loaded with a weight. Any movement occuring in the subsoil causes the wire to perform a corresponding movement on the roller, which is equipped with a length measuring attachment. Changes are thus recorded by a distance measuring operation. Wire extensometers are thus difficult to install, particularly when the securing points are very deep down, but difficulties are also encountered when a number of extensometric measurements have to be carried out in a limited space.

The rod-type extensometers described above have proved satisfactory in their place, the change in the position of the rod being measured by its pick-up element, such as a meter or a probe, on the extensometer head. However, the measuring operation, if carried out at great depths, again involved considerable expense and labour, as the rod system consisted of separate sections which had to be manipulated by hand, which were interconnected by couplings and which were built into the borehole one after the other. Under these circumstances it was not only the constructional outlay as such that proved a drawback but in many instances the time taken to insert the extensometer as well. There are many spheres of application, such as in tunnel building, after the termination of the base, when at a very early stage, for example during the first few hours and days, measurements are required which in their turn are decisive for the lining and safety operations in such structures.

SUMMARY OF THE INVENTION

An object of this invention is to construct a rod extensometer of the type described in such a way that even when measurements are being carried out at great depths the desired measurements can be taken rapidly and at an early stage.

A further object is to provide a rod extensometer which can be easily installed and transported.

According to this invention in a rod extensometer of the type described the rod system consists of a flexible rod made in one piece from reinforced plastic and connected by one end to the anchoring device and by the other to the pick-up element.

The construction according to the invention offers the following advantages:

There is nowadays an abundance of reinforced plastic materials which on the one hand are flexible up to a bending radius of 50 cm. for example, while on the other hand they have sufficient resilience to return from the bent to the linear shape. This makes it possible for the extensometer rod to be made in one piece over its entire length and still be inserted without difficulty into the borehole, even if this extends to depths of up to 100 m. the rod resuming its linear shape after insertion. The only operations required on the building site, therefore, are to make the necessary drillings, insert the rod and its encasing tube with the anchoring device into the borehole in advance, secure the anchoring device at the measuring point by injection and then mount the extensometer head. Its installation can thus be speeded up considerably by comparison with known types of equipment. A further simplification as regards both the transport and the insertion results from the fact that the measuring rod according to the invention can be situated on a delivery spool with a suitable radius of curvature and supplied in the desired length and in its complete form to the building site or else cut to the desired length after reaching the site and then completed. The extraction of such extensometers, if required, is likewise a simpler and more rapid process than before.

In one version of the invention the plastic rod can be stuck, screwed or otherwise inserted in a bore, of the anchoring device. This can be a relatively simple connection, as it is not called upon to transmit any appreciable forces.

In a further version of the invention the plastic rod is connected with the pick-up element via a threaded coupling. This pick-up element can thus be added at a later stage, particularly after the installation of the rod.

The threaded coupling may advantageously consist of a threaded sleeve screwed onto the plastic rod and of a threaded bar which is connected with the said sleeve and onto which the pick-up element can be screwed. The range of adjustment can be extended still further by removing and replacing the threaded bar.

Finally, the plastic rod can be provided with a protective covering, e.g. in order to improve its wear-resistance, even if the movement of the rod inside the encasing tube is not accompanied by any appreciable frictional forces.

DETAILED DESCRIPTION OF THE PREFERRED EMBODIMENT

An embodiment of extensometer in accordance with the invention will now be described by way of example only, with reference to the accompanying drawing which shows a longitudinal section through an extensometer.

The drawing shows the extensometer in the installed position. The parts essential to its function consist of a measuring head 1 with an extensometer head 2, a measuring rod 3 with its encasing tube 4 and an anchoring device 5. The measuring rod 3 is formed from a one piece flexible plastic bar 3 reinforced, for example, with fibre glass, and extending over the entire depth of the borehole and affixed at its lower end to the anchoring device 5 by means of screws, an adhesive, or similar means. The anchoring device is provided with an external profiling 6 to enable it to be faultlessly secured at the measuring point in the rock layer to be examined, in which it is fixed, for example, by an injection of concrete. The plastic bar 3, or at least that part of it which is situated in the encasing tube 4, is provided with a protective coating 7. The free upper end of the plastic bar 3 is connected to a pick-up element 8 via a threaded coupling. The threaded coupling consists of a threaded bar 9 and a threaded sleeve 10 into which the threaded bar is inserted and which in its turn is screwed onto the free end of the plastic bar 3. The pick-up element 8, provided with an internal threading, is screwed onto the other end of the threaded bar 9. The internal threading of the pick-up element 8 enables the pick-up element to be readjusted to the measuring head 1 after the insertion of the extensometer. The adjustment range can be increased by removing the threaded bar 9 and inserting a shorter or longer threaded bar.

The encasing tube 4 surrounding the plastic bar 3 likewise consists of plastic, such as polyvinyl-chloride and is connected to the anchoring device 5 via an elastic sleeve 11. The other end of the encasing tube rests in the extensometer head 2, in which it is secured, for example, with an adhesive. The outside of the extensometer head 2 is provided with a number of hexagonal profiles situated one above the other. A mounting plate 12 with a check nut 13 is placed on this extensometer head. Finally, the extensometer head can be closed by a threaded cap 14.

The mounting plate 12 can be designed to accommodate a number of measuring heads 1 of extensometers of different lengths, in which case the heads 2 of these extensometers can be placed close together in a simple manner by allowing the hexagonal surfaces to rest against one another.

A change in the position of the anchoring device 5 or a movement of the rock layer by which it is secured will manifest itself in a change in the position of the pick-up element 8 in relation to the mounting plate 12 or the extensometer head 2, so that it can be measured by means of a distance measuring apparatus, e.g. a meter or similar device, on the said pick-up element.

What is claimed is:

1. An extensometer for measuring movements in rock structures and in foundations, said extensometer comprising:
    (a) an anchoring device adapted to be secured to said structure or foundation;
    (b) a single continuous flexible measuring rod having one end adapted to be connected to said anchoring device and having a free end bearing, said measuring rod being sufficiently resilient such that it may be wound and then unwound to assume a substantially linear configuration;
    (c) a pick-up element;
    (d) an encasing tube adapted to encase the measuring rod and in which the measuring rod is freely movable; and
    (e) an extensometer head adapted to be connected to the encasing tube so as to be adjacent the pick-up element, whereby, when assembled, the change in position of the pick-up element in relation to the extensometer head is measurable as an indication of said movements.

2. An extensometer according to claim 1 in which the anchoring device has a bore in which said one end of the measuring rod is secured.

3. An extensometer according to claim 1 in which said free end of the measuring rod is connected to the pick-up element by a threaded coupling device.

4. An extensometer according to claim 3 in which the threaded coupling device consists of a threaded sleeve screwed onto said one end and a threaded bar connected to said sleeve and onto which the pick-up element can be screwed.

5. An extensometer according to claim 1 wherein said measuring rod is a reinforced plastic rod, and said extensometer includes a protective coating on the reinforced plastic rod.

6. The extensometer as defined by claim 1 wherein said measuring rod is wound on a spool whereby it may be unwound and inserted within said encasing tube.

* * * * *